(12) United States Patent
Koseki et al.

(10) Patent No.: US 8,161,467 B2
(45) Date of Patent: *Apr. 17, 2012

(54) COMPILING METHOD AND STORAGE MEDIUM THEREFOR

(75) Inventors: Akira Koseki, Sagamihara (JP); Mikio Takeuchi, Zama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/932,853

(22) Filed: Oct. 31, 2007

(65) Prior Publication Data

US 2008/0141216 A1    Jun. 12, 2008

Related U.S. Application Data

(63) Continuation of application No. 10/063,958, filed on May 29, 2002, now Pat. No. 7,331,044.

(30) Foreign Application Priority Data

May 29, 2001    (JP) .................................. 2001-161364

(51) Int. Cl.
*G06F 9/45* (2006.01)
(52) U.S. Cl. ......... 717/142; 717/143; 717/154; 717/159
(58) Field of Classification Search ........................ None
See application file for complete search history.

(56) References Cited

U.S. PATENT DOCUMENTS

| | | | |
|---|---|---|---|
| 4,084,224 A * | 4/1978 | Appell et al. ................. | 718/100 |
| 5,530,866 A | 6/1996 | Koblenz et al. | |
| 5,555,417 A | 9/1996 | Odnert et al. | |
| 6,018,799 A | 1/2000 | Wallace et al. | |
| 6,449,713 B1 | 9/2002 | Emer et al. | |
| 6,625,746 B1 | 9/2003 | Moore | |
| 6,738,967 B1 | 5/2004 | Radigan | |

FOREIGN PATENT DOCUMENTS

| | | |
|---|---|---|
| JP | H02-217925 | 8/1990 |
| JP | H05-012015 | 1/1993 |
| JP | H07-281897 | 10/1995 |
| JP | 2000-066901 | 3/2000 |

OTHER PUBLICATIONS

"Newborn INTEL Places Its Hope in Itanium", Nikkei Electronics, Nov. 29, 1999, No. 758, pp. 138-153.
IA-61 / Itanium, ASCII DOSIV Issue vol. 6 No. 6, Jun. 1, 20000, pp. 174-177.
Martin, et al., "Exploiting Dead Value Information", 1997, IEEE, pp. 125-135.
Bringman et al., "Speculative Execution Exception Recovery Using Write-back Suppression", 1993, IEEE, pp. 214-223.

* cited by examiner

*Primary Examiner* — Chuck Kendall
(74) *Attorney, Agent, or Firm* — Ference & Associates LLC

(57) ABSTRACT

A compiler includes a register allocator for allocating registers for instructions in a program to be compiled, and a code generator for generating object code based on the register allocation results performed by the register allocator. The register allocator allocates logical registers for instructions in the program to be compiled. The register allocation further allocates, to physical registers, the logical registers that are allocated to the instructions of the program, so that the physical registers that are live at a procedure call in the program to be compiled are allocated from the bottom of the register stack.

4 Claims, 7 Drawing Sheets

COMPILING METHOD AND STORAGE MEDIUM THEREFOR

CROSS-REFERENCE TO RELATED APPLICATIONS

This application is a continuation application of U.S. patent application Ser. No. 10/063,958 filed on May 29, 2002, now U.S. Pat. No. 7,331,044, the contents of which are hereby incorporated by reference in its entirety.

FIELD OF THE INVENTION

The present invention relates to a method for efficiently using a stack register for a CPU architecture that employs a register stack.

BACKGROUND ART

Certain architectures for the processors (CPUs) used in computers employ register as register stacks. For example, in the 64-bit architecture CPU IA-64, developed jointly by Intel Corp. and Hewlett Packard Corp., one part of general-purpose registers serves as a register stack.

For a register stack, only those registers, from among the physical registers prepared for a processor, that are required for the execution of procedures are employed as logical registers (hereinafter, in the following explanation, referred to simply as a register when there is no need to differentiate between physical registers and logical registers). For each procedure, the number of registers employed are designated and allocated by an "alloc" instruction, and when a calling source is recovered, these registers are released. In the procedures, the number of registers designated (hereinafter also referred to as "allocated") by the alloc instruction are statically employed.

The registers in a register stack (stack registers) are employed, from the bottom to the top, as "in" arguments, local variables and "out" arguments. When a procedure has been called, an allocated "out" argument for the procedure is renamed, at the calling destination, as "in" argument.

The registers that are allocated are obtained in order by renaming a definite number of physical registers. When at allocation time there is a shortage of physical registers (a stack overflow), registers that are currently allocated are automatically restored to the memory and a new physical register is obtained. Further, when, at the time task execution is recovered by the calling source, the registers allocated to the calling source are restored to the memory (a stack underflow), restored values are automatically recovered by the registers.

Since a register stack is employed, the processing costs associated with the restoring and the recovery of registers can be avoided, so long as a stack overflow or a stack underflow does not occur.

As is described above, when a register stack is employed in the CPU architecture, the costs associated with the restoring or the recovery of registers can be avoided, so long as a stack overflow or a stack underflow does not occur.

Recently, now that CPUs that can execute instructions in parallel have become available, various register allocation methods devised to take advantage of parallel instruction processing have been proposed for inclusion in program compilation techniques. According to these methods, to reduce the parallel execution related barriers that may arise due to the occurrence of reverse dependencies or output dependencies, different registers are allocated for instructions that are executed in parallel. Therefore, the number of registers that are employed for each procedure tends to be increased.

While this method is indispensable for obtaining the parallel execution capacity of processors, the frequency whereat stack overflows or stack underflows occur is increased as the number of registers used rises. And since the cost of a stack overflow or a stack underflow is generally very high, the excessively frequent occurrence of stack overflows or of stack underflows will greatly deteriorate the execution performance of a program.

As is described above, conventionally, when a register stack is employed, the number of registers designated by the alloc instruction are statically employed for a specific procedure.

However, when another procedure is called by a specific procedure, all allocated registers are not always employed. In this case, even though there are unused registers in a stack, new registers are allocated and stack resources are wasted.

SUMMARY OF THE INVENTION

It is a feature of the present invention to minimize the occurrence of stack overflows and stack underflows in the generation of program code for processor architectures employing register stacks, so as to prevent performance deterioration, during the execution of a program, due to the occurrence of stack overflows or stack underflows.

It is another feature of the present invention to provide a method that ensures, during the generation of program code for a processor architecture that employs a register stack, that at the execution step of a procedure stack registers will not be under used, and will be employed efficiently.

To achieve the above features, according to the present invention, a compiling method for converting into object code a program written in source code includes the steps of, allocating registers for a program to be compiled and generating object code based on the register allocation. The step of allocating registers includes the steps of allocating logical registers for instructions in the program, and performing mapping between the logical registers and physical registers, so that the physical registers that are live at a procedure call in the program to be compiled are allocated from the bottom of the register stack.

According to the present invention, a code generation method for generating code for a program that controls a computer includes the steps of generating code while confirming that registers are allocated for a predetermined instruction and upon the calling of the procedure, so long as there is a vacancy in operation resources, copying the registers residing in the register stack, to free registers located at the bottom of the register stack.

According to the present invention, a method, for employing a stack register when a processor with a register stack executes a program, comprises the steps of: when a different procedure is called in a predetermined procedure, reallocating registers that are allocated for the execution of the predetermined procedure and that are live when the different procedure is called, and calling the different procedure, while the registers that are live when the different procedure is called are maintained in the stack, and as many registers as possible that are not present are abandoned; and upon the return from the different procedure, restoring the register image to the state immediately before the reallocation.

According to the invention, a method, for employing a stack register when a program is executed by a processor with a register stack, comprises the steps of: each time a procedure is called, packing and allocating existing logical registers; performing the procedure, and restoring the register image to the state before the packing.

Further, according to the present invention, a program can be provided that permits a computer to perform processes corresponding to the steps of the compiling method, the code generation method and the stack register employment method. This program can be distributed by being stored on a magnetic disk, on an optical disk, in a semiconductor memory or another storage medium, or by being transmitted via a network by the storage device of a program transmission apparatus connected to the network.

Furthermore, according to the present invention, a compiler for converting into machine language code the source code of a program written in a programming language comprises: a register allocator, for allocating registers for instructions in the program to be compiled; and a code generator, for generating object code based on the register allocation process performed by the register allocator, wherein the register allocator allocates logical registers for instructions in the program to be compiled, and allocates, to physical registers, the logical registers that are allocated to the instructions of the program, so that the physical registers that are live at a procedure call in the program to be compiled are allocated from the bottom of the register stack.

In addition, according to the invention, a compiler for converting into machine language code the source code of a program written in a programming language comprises: a register allocator, for allocating registers for instructions in the program to be compiled; and a code generator, for generating object code based on the register allocation process performed by the register allocator, wherein the code generator generates code while confirming that registers are allocated for predetermined instructions, and wherein, upon a procedure being called, the code generator, so long as there is a vacancy in operation resources, copies the registers residing in the register stack, to free registers that are located at the bottom of the register stack.

According to the present invention, a computer having the following structure is provided. The computer comprises: input means, for entering source code of a program; and a compiler, for compiling the source code and converting the compiled code into machine language code, wherein, before a different procedure is called in a predetermined procedure of a program to be compiled, the compiler generates code for reallocating registers that are allocated for the execution of the predetermined procedure and that are live when the different procedure is called, so that only the registers remain in a stack, and generates code, for restoring the register image, upon the return from the different procedure, to the state immediately before the reallocation.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION OF THE INVENTION

In the mapping step, allocation is done so that logical registers that are live across more procedure calls, are first allocated at the bottom of the stack.

Also at the mapping step, allocation is done, so that logical registers that are live across a procedure call at which fewer logical registers are live at the same time are first allocated at the bottom of the stack.

The step of reallocating the registers and calling the different procedure includes the steps of: sorting and reallocating, from the bottom of the register stack, the registers that are live when the different procedure is called.

The register allocator allocates the logical registers and the physical registers first for an important portion of the program to be compiled. While for a less important portion of the program, the code generator generates compensation code for allocation of the logical registers and for allocation of the physical registers for the important portion.

The importance level of the portion in this program can be determined by referring to the execution frequency of the pertinent portion when the program is executed. That is, logical registers and physical registers are allocated first for the portion having the highest execution frequency that is therefor regarded as the important portion.

The preferred embodiment of the present invention will now be described in detail while referring to the accompanying drawings.

Figure 1:
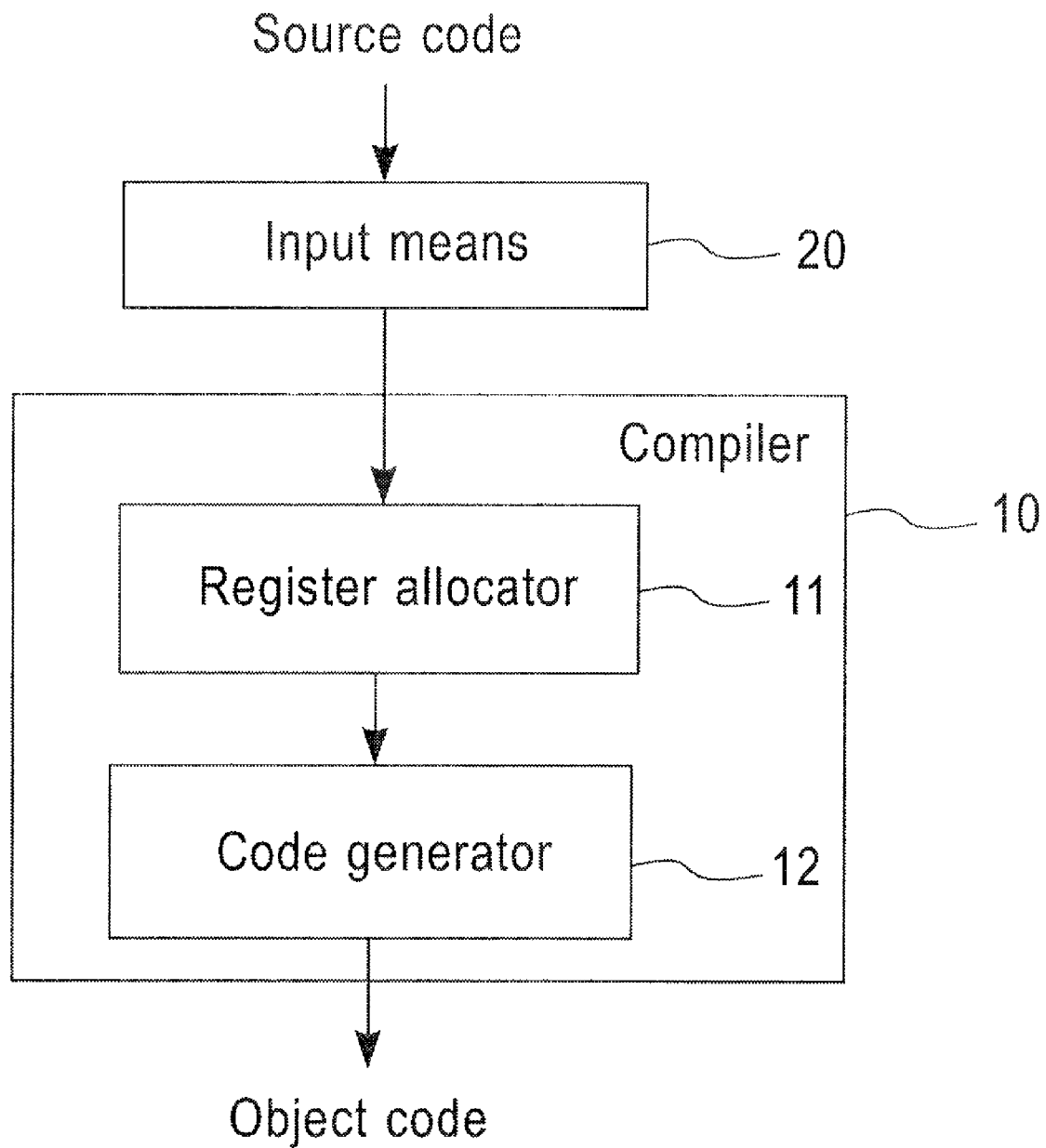
FIG. 1 is a diagram for explaining the general configuration of a compiler according to one embodiment of the present invention.

FIG. 1 is a diagram for explaining the general configuration of a compiler according to the embodiment.

A compiler 10 in FIG. 1 receives, from input means 20, a program (source code) to be compiled, compiles the program, and generates and outputs object code written in a machine language.

In FIG. 1, the compiler 10 of this embodiment comprises: a register allocator 11 for allocating registers for instructions in a program; and a code generator 12 for converting into object code source code for which register allocation has been performed.

The register allocator 11 performs mapping between variables and logical registers using a coloring method, and performs further mapping between the logical registers and physical registers in order to perform register allocation. In this embodiment, the register mapping is performed using a method, which will be explained later, that is especially effective for ensuring the efficient use of a register stack.

The code generator 12 generates object code corresponding to the source code to be compiled. At this time, based on the register mapping results obtained by the register allocator 11, an "alloc" instruction for initiating the use of a register stack and an instruction for resetting an argument are generated. Further, in this embodiment a method, which will be described later, is employed to generate code while taking into account the efficient use of the register stack.

The compiler 10 in FIG. 1 can be implemented by a personal computer, a work station or another computer, and the components shown in FIG. 1 are virtual software blocks of code run by a CPU that is controlled by a computer program. The computer program that controls the CPU can be provided by being stored on a storage medium, such as a CD-ROM or a floppy disk, or by being transmitted via a network.

The components of the compiler 10 in FIG. 1 are related to the characteristic functions of the invention. Although not shown, the compiler 10 actually comprises general compiling process functions, such as phrase analysis, syntax analysis and input program optimization.

The input means 20 in FIG. 1 can be implemented by a reader for reading a program (source code) from a predetermined storage device, or a network interface for receiving a program (source code) from another computer via a network.

It is assumed that the object code compiled by the compiler 10 in this embodiment is executed by a CPU having a CPU architecture that employs a register stack, such as the IA-64 microprocessor. Therefore, for each procedure, the number of registers to be used are designated by an alloc instruction, and are obtained from among the available physical registers. When the task performed by the called procedure is completed, the registers allocated for the procedure are released.

Even if the parallel oriented register allocator 11 requires many registers, all the registers initially obtained need not be used for storage, regardless of whether the procedure is called. As a consequence, in this embodiment the allocation of registers is performed precisely.

Specifically, when a certain procedure issues a call to another procedure, designated registers for which instructions have been allocated (hereinafter this state is described as being alive) by the calling procedure and that are in use when the call to the other procedure is issued are re-packed and re-allocated for the stack register, and the different procedure is called again. In this process, since the registers allocated for the original procedure that are not in use when the different procedure is called (hereinafter this state is described as being dead) are released, the count of the registers allocated for the original procedure is reduced by a number equivalent to that of the released registers.

At the time task execution is recovered from the called procedure, the register image is restored to its original state. This is done because the maximum number of registers allocated by the original alloc instruction are required by the original procedure that issued the call to the other procedure. That is, in this embodiment, only those registers required by the called procedure are obtained, while the remainder is released, and when task execution is recovered from the called procedure by the original procedure, the register image must be restored to its original state.

As is described above, since the packing of the stack register is performed each time a procedure is called, currently dead registers can be effectively utilized, so that the frequency whereat stack overflows occur can be reduced.

However, when the allocation of the registers is precisely performed each time a procedure is called, execution time may be increased by the register shifting that is performed each time the registers are packed.

Therefore, in this embodiment, the following two methods are proposed for performing the packing of registers while avoiding the deterioration of code quality that can accompany the shifting of registers.

A first method is a register allocation method employed while taking register packing into account (methods (1) and (2), which will be described later). According to this method, registers that are live when a procedure is to be called are allocated and moved to the bottom of a stack in advance. The processing for this method is performed by the register allocator 11 of the compiler 10 in FIG. 1.

A second method is a register packing method performed during code generation each time a procedure is called (method (3), which will be described later). The processing for this method is performed by the code generator 12 of the compiler 10 in FIG. 1.

For the first method, wherefor the register allocator 11 performs the register packing, the code generator 12 performs a normal code generation process based on the register allocation performed by the register allocator 11. For the second method, wherefor the code generator 12 performs the register packing, the register allocator 11 performs only normal register allocation, and shifts the program control to the code generator 12.

The individual methods will now be described in detail.

(1) Method for performing register allocation while taking register packing into account.

According to this method, after the mapping of a variable and a logical register is determined by employing a method such as graph coloring, the mapping of a logical register and a physical register is determined at the time a procedure is called while taking into account the register packing that is performed.

According to this method, the priority ordering of logical registers is determined based on the following two strategies, and in accordance with this ordering, physical registers are allocated from the bottom of the register stack.

Strategy 1: A higher priority is provided for logical registers, such that procedures wherein the existing intervals of logical registers are overlapped are frequently called.

Strategy 2: A higher priority is provided for a smaller number of logical registers, the existing intervals of which are overlapped, that are alive at the same time as a procedure call occurs.

These two strategies will now be described while referring to FIGS. 2 to 4.

Figure 2:
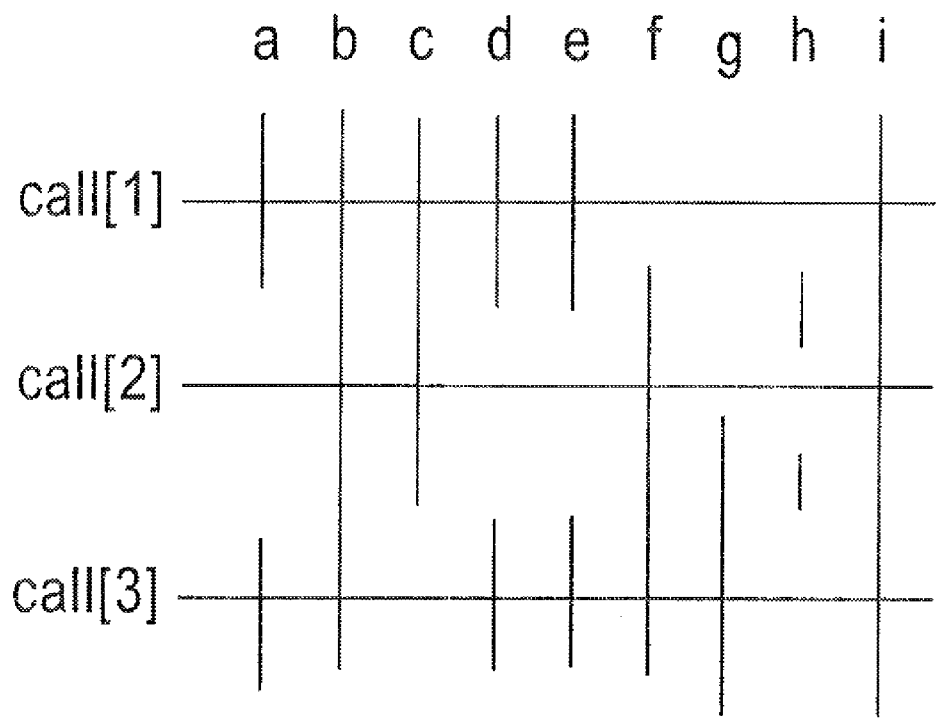
FIG. 2 is a diagram showing existing intervals of logical registers when three procedure calls occur for a procedure wherein nine registers are allocated.

FIG. 2 is a diagram showing the existing intervals of nine logical registers, a to i, at the times whereat three procedure calls (call [1], call [2] and call [3]) occur for the procedure to which the registers are assigned. FIG. 3 is a diagram showing the state wherein the logical registers in FIG. 2 are sorted based on strategy 1. And FIG. 4 is a diagram showing the state wherein the logical registers in FIG. 3 are further sorted based on strategy 2.

As is shown in FIG. 2, when the registers are allocated, from the bottom of the stack in the order a to i, three registers f, g and h are dead at the time of procedure call [1]. Similarly, five registers a, d, e, g and h are dead at the time of procedure call [2], and two registers c and h are dead at the time of procedure call [3]. That is, these registers are wasted.

Thus, assume that by using strategy 1, a logical register for a procedure for which there are many procedure calls and wherein the existing intervals of the logical registers are overlapped, is first allocated and then moved to the bottom of the register stack. In FIG. 3, the state wherein the registers are thus sorted is shown. In FIG. 3, the logical registers for procedures for which there is the same procedure call and wherein the existing intervals of the registers are overlapped are arranged in dictionary order.

Figure 3:
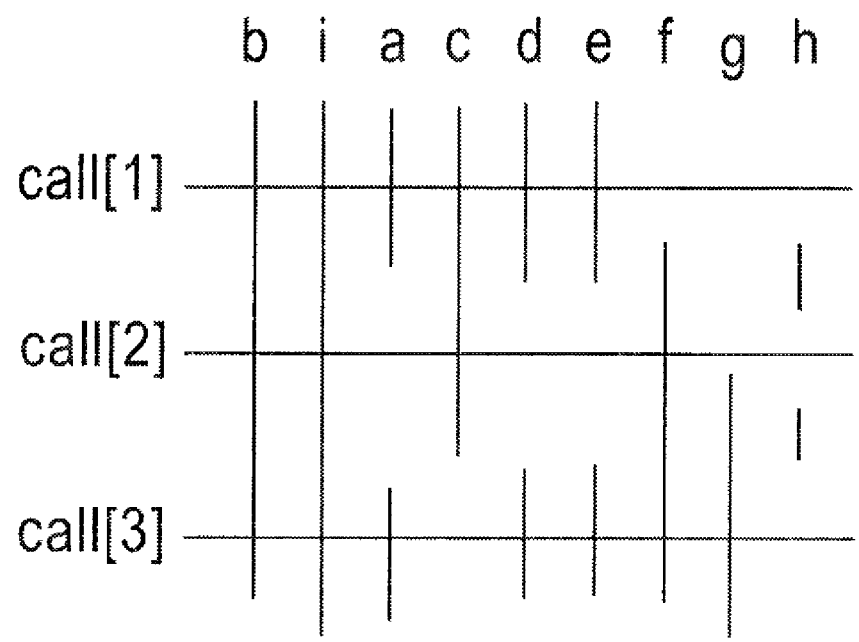
FIG. 3 is a diagram showing the state wherein the logical registers in FIG. 2 are sorted based on a method according to the embodiment.

In FIG. 3, the logical registers b and i, which are relevant to all three procedure calls, are moved to the bottom of the stack. Therefore, three upper registers are empty at call [1], and similarly, two upper registers are empty at call [2] while one upper register is empty at call [3]. Thus, when the procedures requested by these procedure calls are executed, these registers are released and the re-allocation of registers is enabled.

However, even in this state, three registers a, d and e are dead at procedure call [2], and one register c is dead at procedure call [3], so that these registers are wasted.

Therefore, while using strategy 2, assume that, at the time of the call for the procedure, the existing intervals of which are overlapped, simultaneously present registers, the number of which is small, are first allocated and then moved to the bottom of the register stack. In FIGS. 2 and 3, for registers a, c, d, e and f, for each of which there are two procedure calls, the existing intervals of which are overlapped, the number of like logical registers that are alive at the time of call [2] is two, which is smaller than the number of registers at the time of the other calls (four registers in both cases). Therefore, higher priorities are awarded the logical register c and the logical register f, which are related at this time. In the state in FIG. 4, the registers are sorted in this manner. It should be noted that in FIG. 4 the logical registers, the existing interval of which is overlapped, that have the same procedure calls are arranged in dictionary order.

Figure 4:
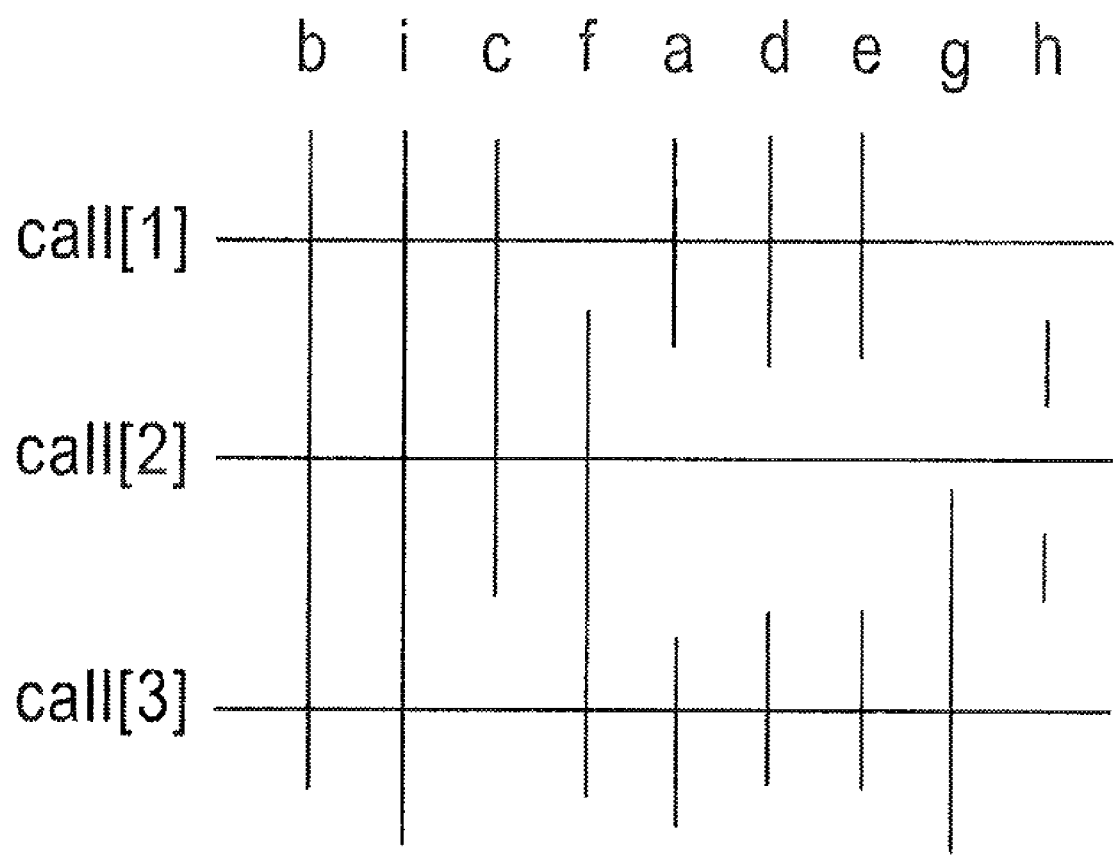
FIG. 4 is a diagram showing the state wherein the logical registers in FIG. 3 are sorted based on another method according to the embodiment.

In FIG. 4, as is described above, the logical registers c and f are moved toward the bottom of the stack so that they follow the logical registers b and i. As a result, the number of upper registers that are empty at call [1] is decremented by one to two, while five registers are empty at call [2], and one register is empty at call [3]. Therefore, when a procedure for which execution is requested by the procedure calls is executed, these empty registers are released and re-allocation is enabled.

Through the above processing, the number of registers that remain dead are two as a result of calls [1], [2] and [3]. Compared with the state in FIG. 2, eight registers are apparently effectively employed and optimal results are obtained.

It should be noted that the sorting using strategy 2 is performed with lower weighting than is the sorting using the strategy 1. Therefore, in the sorting using strategy 2, the order that is determined using strategy 1 (in accordance with the frequencies of the procedure calls) need not be changed. For example, even when the logical register g is not alive at call [3] but is at call [2], in the state in FIG. 4 the logical register g is not moved and placed closer to the bottom than the logical register e.

Figure 5:
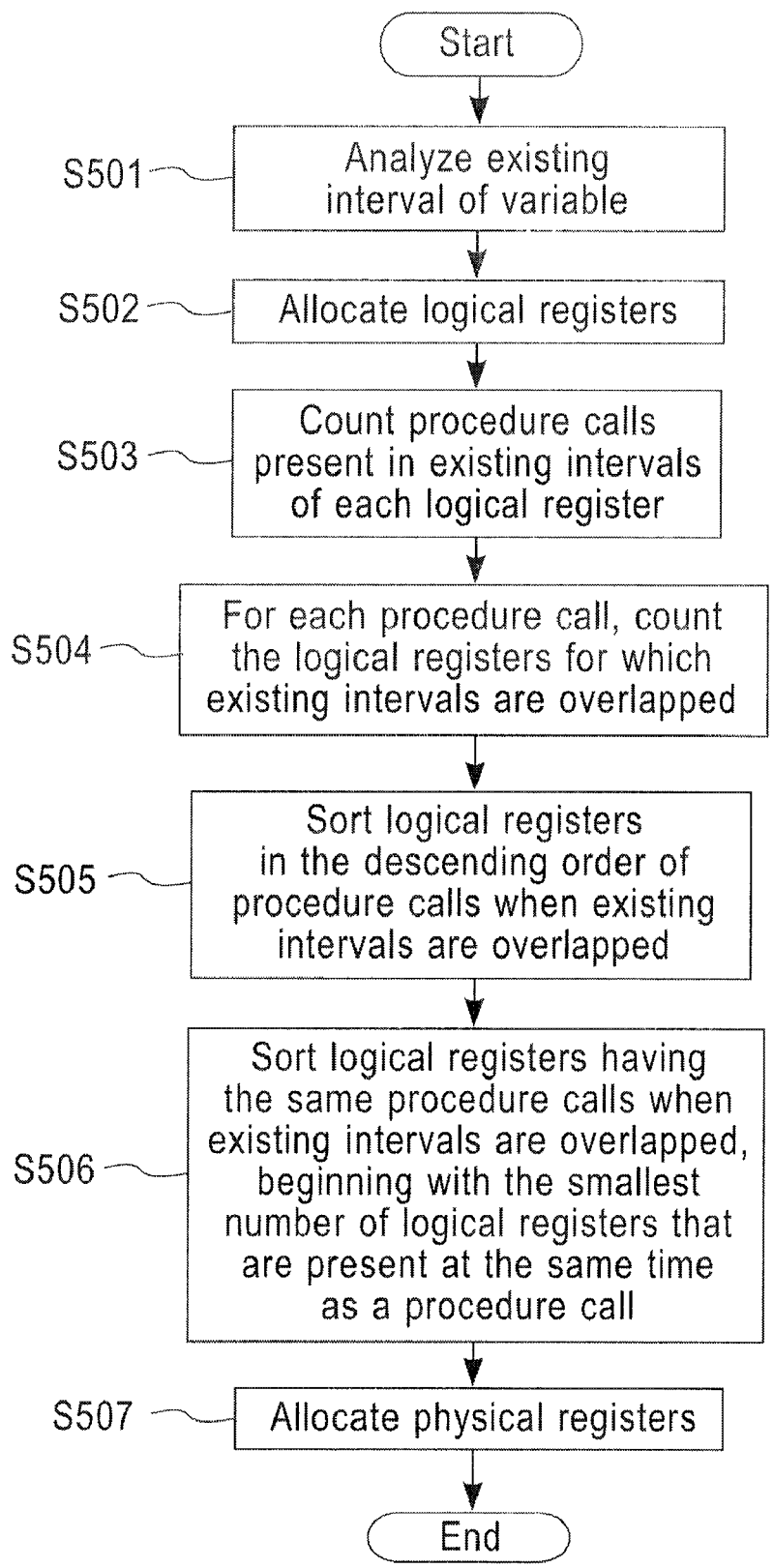
FIG. 5 is a flowchart for explaining a register allocation algorithm for a register allocator according to the embodiment.

FIG. 5 is a flowchart for explaining the register allocation algorithm of the register allocator 11 using the method of the invention.

As is shown in FIG. 5, the register allocator 11 first analyzes an interval wherein a variable exists (step 501). Then, based on this analysis, the register allocator 11 performs the normal register allocation for logical registers (step 502).

Following this, the register allocator 11 counts, for each logical register, the number of procedure calls that are present in the existing intervals of the register (step 503). Further, the register allocator 11 counts, for each procedure call, the number of logical registers for which existing intervals overlap (step 504). The processes at steps 503 and 504 may be inversely performed.

Thereafter, the register allocator 11 sorts the logical registers in the descending order of the count, for each logical register, of the procedure calls in which overlapped existing intervals are present (step 505). If the number of procedure calls is the same, the logical registers are sorted, for example, in dictionary order.

Next, the register allocator 11 sorts the logical registers beginning with those for which, at the time of the procedure call, the number present is the smallest (step 506). Specifically, all the procedure calls are detected in which overlapped existing intervals of predetermined registers are present, and an average value is calculated for the number of logical registers, the existing intervals of which are present in these procedure calls. When the same number of logical registers are simultaneously alive during procedure calls, the logical registers are sorted, for example, in dictionary order.

Finally, based on the sorting results obtained at steps 505 and 506, the register allocator 11 maps, on the logical registers, stack registers that are physical registers, from the bottom of the register stack (step 507).

After the register allocator 11 has completed the register allocation, the code generator 12 generates code actually used for implementing the efficient use of the stack register.

Figure 6:
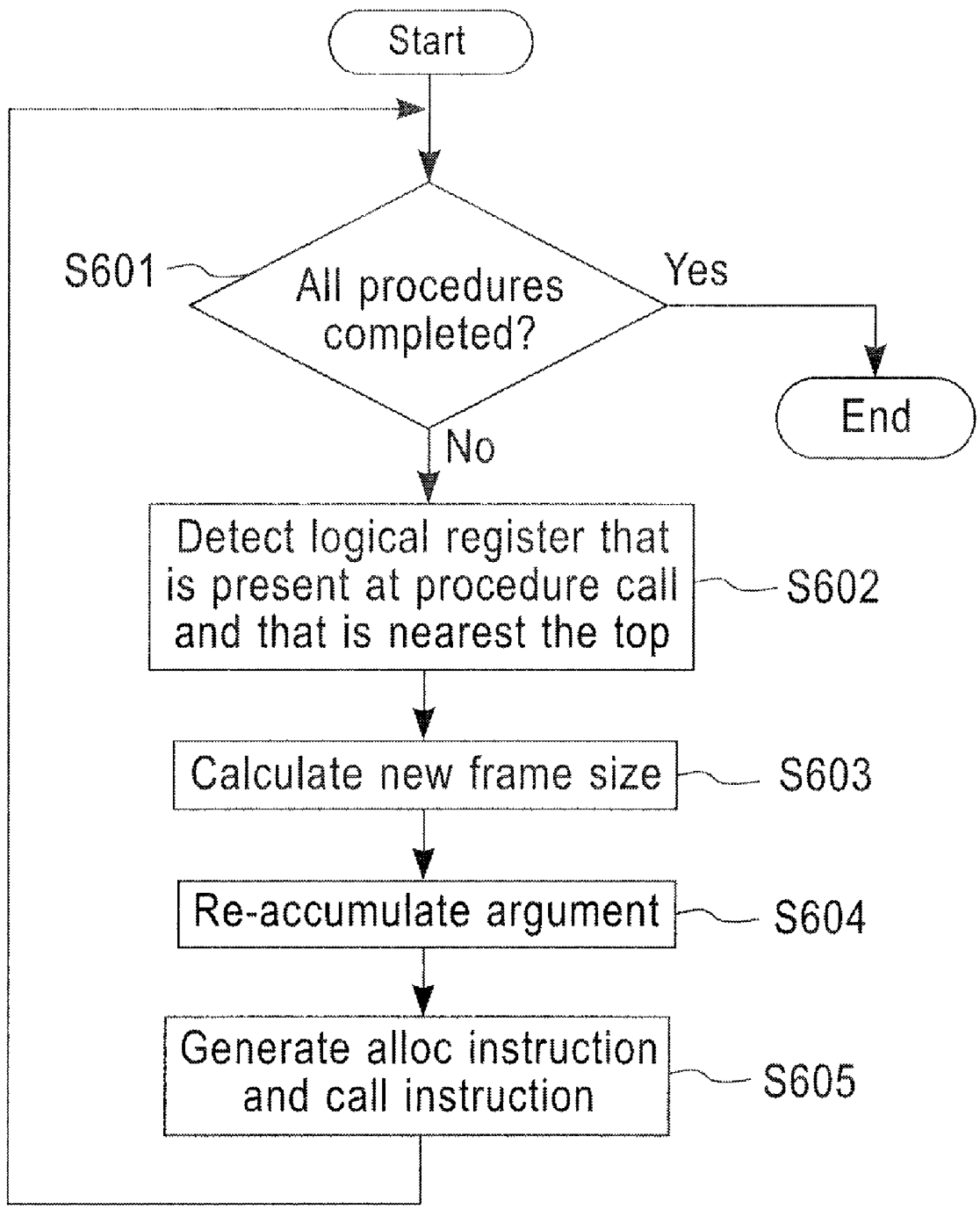
FIG. 6 is a flowchart for explaining the processing according to the embodiment wherein a code generator re-allocates stack registers by using register allocation results obtained by the register allocator.

FIG. 6 is a flowchart for explaining the processing performed by the code generator 12 for reallocating stack registers using the register allocation results. It should be noted that normal code generation is performed by the code generator 12 before the processing in FIG. 6 is begun, and that after this generation the code generator 12 performs the processing in FIG. 6 for each procedure in the program.

In FIG. 6, first, from among the logical registers that are alive at a target procedure call, the code generator 12 detects the logical register at the top of the register stack (steps 601 and 602). Then, while it is assumed that the location of the detected logical register in the register stack is a new stack top of the register stack to be reallocated, a new frame size is calculated (step 603).

Subsequently, the code generator 12 re-accumulates arguments based on the new frame size obtained at step 602 (step 604). Specifically, first, a new argument is accumulated at a vacant argument accumulation destination, and then, a further argument is accumulated for the vacant argument accumulation destination. This process is repeated until there are no more vacant argument accumulation destinations. Further, an unprocessed argument is accumulated by using a working register.

When the re-accumulation of arguments has been competed, the code generator 12 generates an alloc instruction to generate a new frame, a procedure call instruction (call instruction), and an alloc instruction for restoring the frame to its original state (step 605).

When the processes at steps 602 to 605 have been performed for all the procedures in the program, the processing is terminated (step 601).

(2) Method using the locality of a program.

According to this method, the method (2) is locally applied for a program, while the method (1) is used as a basis.

The program is normally constituted by multiple parts, the importance of which, depending on the parts, may differ. Therefore, according to this method, instead of applying the method (1) for the entire program, register packing is performed first for the important parts of the program.

Specifically, a hot spot that is very important is designated by using profile information, and registers are so allocated that at a procedure call present along the path, the maximum packing of the registers is performed. Furthermore, a compensation code for the packing performed for a path that constitutes a hot spot is output for a path that is not a hot spot.

The importance levels of the parts of the program are determined relatively. That is, packing is performed so that the stack registers can be employed the most efficiently for the most important part, and if the importance level of this part is reduced, a compensation code for the packing of a currently more important part is generated.

Figure 7:
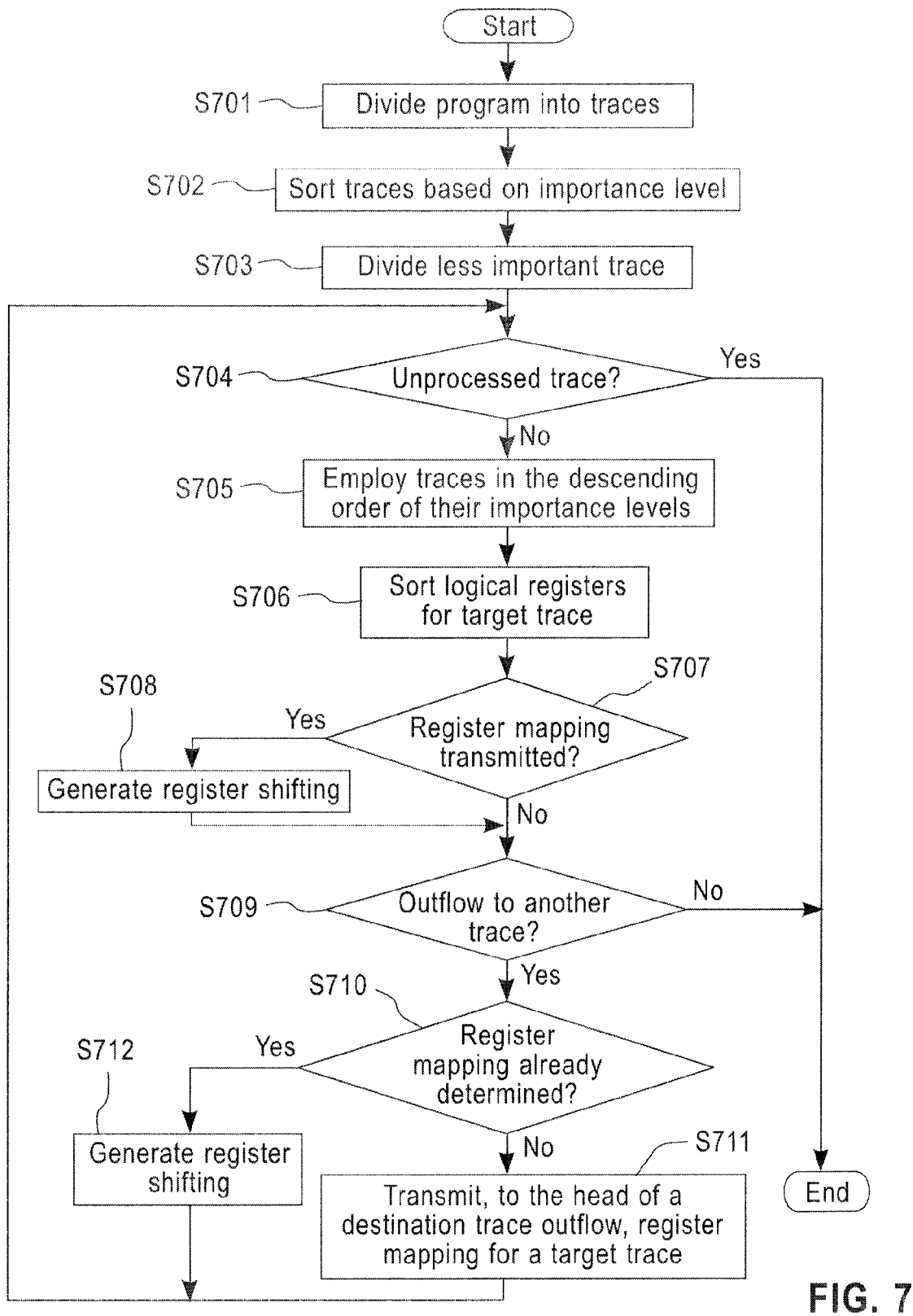
FIG. 7 is a flowchart for explaining another register allocation algorithm for the register allocator according to the embodiment.

FIG. 7 is a flowchart for explaining a register allocation algorithm for the register allocator 11 using the method of the invention. While taking into account that register movement is not generated at a hot spot, this processing is performed using the algorithm in the flowchart in FIG. 7.

As is shown in FIG. 7, first, the register allocator 11 of the compiler 10 divides a program into traces (step 701), and sorts the traces based on their importance levels, such as their execution frequencies (step 702).

Then, to prepare a pad for register shifting, the register allocator 11 divides a less important trace as needed (step 703). Specifically, when there is an outflow from a less important trace to a more important trace, the less important trace is divided at the outflow point. Further, when there is an inflow from a more important trace to a less important trace, the less important trace is divided at the inflow point.

The register allocator 11 sequentially performs the following process for each of the thus sorted traces (i.e., in the descending order of their importance levels) (steps 704 and 705).

First, for a target trace, the logical registers are sorted using method (1) (step 706).

Then, a check is performed to determine whether the mapping of the logical register and the physical register for a different trace is to be transmitted to the head of the target trace. When the mapping is transmitted, register shifting is generated at the head of the target trace in order to compare the transmitted mapping and the sorting results at step 706 (steps 707 and 708).

A check is then performed to determine whether there is an outflow from the target trace to a predetermined trace (step 709), and when there is no outflow, the processing is terminated. When there is an outflow, a check is further performed to ascertain whether the mapping of the logical register and the physical register at the head of a destination trace has been determined (steps 709 and 710).

When the mapping of the logical register and the physical register at the head of the destination trace has not yet been determined, the register allocator 11 transmits, to the head of the destination trace, the mapping of the logical register and the physical register for the target trace (steps 710 and 711). Since the traces are employed in the descending order of their importance levels, it is ensured that the importance level of the destination trace is not higher than that of the target trace.

When the mapping of the logical register and the physical register at the head of the destination trace has already been determined, it is assumed that the importance level of the destination trace is higher than that of the target trace. In this case, the mapping of the logical register and the physical register has already been determined only for the trace that from the end of the target race is the outflow destination. This is because if at step 703 there is an outflow from a less important trace to a more important trace, the less important trace is divided at the outflow point, so that it is ensured that the mapping of the logical register and the physical register, at the head of the trace that from a specific trace is the outflow destination, has not yet been determined.

Therefore, the register shifting is generated at the end of the target trace in order to compare the sorting results for the target trace at step 706 and the mapping of the logical register and the physical register for the outflow destination trace (steps 710 and 712).

When the processes at steps 706 to 713 have been completed for all the traces (step 704), the register allocation process performed by the register allocator 11 is terminated.

Following this, the code generator 12 employs the register allocation results obtained by the register allocator 11 to generate code to actually implement the efficient use of the stack register. Since the code generation process is performed by the code generator 12 in the same manner as the process using the method (1) in the flowchart in FIG. 6, no detailed explanation for it will be given.

Through the above processing, the stack register can be efficiently used as a preference for an important part (e.g., a frequently executed part) of the program. Therefore, although there are some parts of a program for which the use of a stack register is less efficient, the execution function of the entire program can be improved.

The processes using the methods (1) and (2) are performed as a part of the register allocation process by the register allocator 11. Since the code generator 12 generates codes in accordance with the allocation results obtained while taking the register packing into account, the program execution time will not be increased due to the register shifting that occurs during the packing of the registers.

(3) Method for performing register packing for each procedure call during code generation.

According to this method, code is generated by tracking registers to determine whether they are alive, and so long as there is a vacancy in operation resources at a procedure call, the contents of a register that is alive and is present near the top of the stack are copied to a dead register that is present near the bottom of the stack.

While a processor that can process instructions in parallel can simultaneously execute multiple instructions, the number of instructions appropriate for the execution capability (operation resources) of a processor are not always executed because of the need for synchronization of the instructions. Therefore, according to this method, when there is a vacancy in operation resources, register packing is performed using the empty resource.

Figure 8:
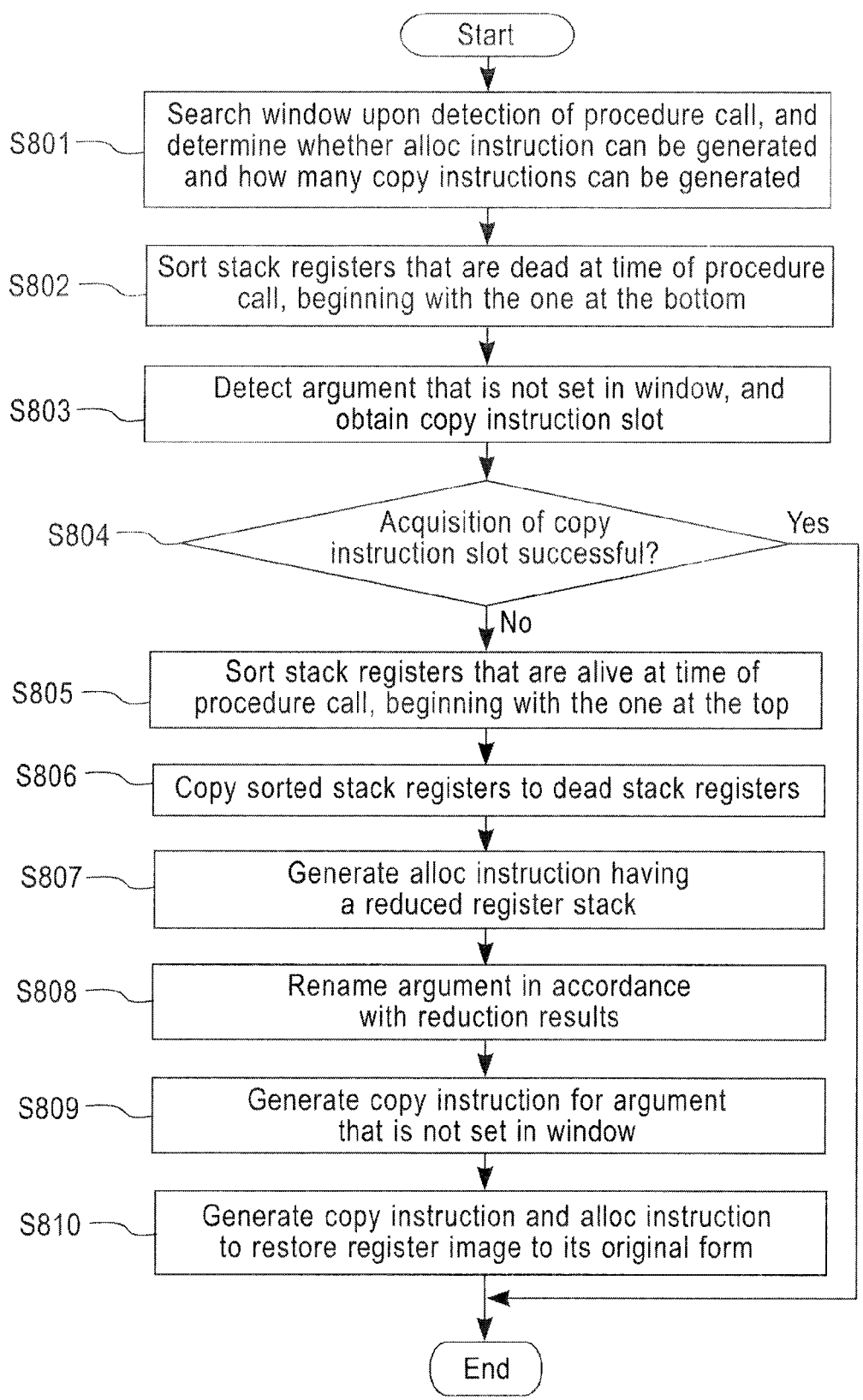
FIG. 8 is a flowchart for explaining a code generation algorithm for a code generator according to the embodiment.

FIG. 8 is a flowchart for explaining the code generation algorithm of the code generator 12 using the method (3). This method is carried out by the algorithm in the flowchart in FIG. 8.

As is shown in FIG. 8, first, when an instruction scheduling window (hereinafter referred to simply as a window, as in FIG. 8) is flashed upon the detection of a procedure call, the code generator 12 of the compiler 10 searches the window and determines whether an alloc instruction can be generated, and how many copy instructions can be generated at that time (step 801).

Then, the code generator 12 detects stack registers that are dead at the time of a procedure call, and sorts them, beginning with the one at the bottom of the stack (step 802).

Next, the code generator 12 detects an argument that is not set in the window, and obtains a copy instruction slot to re-set the argument (step 803). When a copy instruction slot can not be obtained (step 804), the processing performed using the method (3) is terminated.

Following this, the code generator 12 detects stack registers that are alive at the time of the procedure call, and sorts them beginning with the one at the top of the stack (step 805). The sorted stack registers are sequentially copied to dead stack registers so long as a copy instruction slot is available (step 806). The dead stack registers are used sequentially, beginning with the one at the bottom of the stack.

At the obtained location for the generation of an alloc instruction, the code generator 12 generates an alloc instruction having a reduced register stack (step 807), and renames the argument in accordance with the reduction results (step 808). For an argument that is not set in the window, a copy instruction for re-setting the argument is generated at the location obtained at step 803 (step 809).

Finally, at the end of the procedure call, the code generator 12 generates a copy instruction and an alloc instruction in order to restore, to its original state, the register image that has been moved as is described above (step 810).

Through the above processing, the contents of a register can be moved toward the bottom of the register stack and the register at the top released, but only when there is a vacancy in operation resources of the processor that is adequate for the performance of register packing. Therefore, the efficient use of stack registers is acquired using register packing, and in addition, an increase in the program execution time due to the register movement that occurs during register packing can be prevented.

As is described above, according to the present invention, in the generation of program code for a processor having an architecture that includes a register stack, the occurrence of stack overflows or stack underflows can be suppressed, and deterioration of the execution function of the program can be prevented.

Further, according to the present invention, during program code generation, the occurrence of a register that is not used upon the execution of a procedure can be suppressed, and stack registers can be efficiently employed.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

What is claimed is:

1. A process for controlling a computer for conversion of a program to be executed, which permits said computer to perform:

a process for allocating one or more logical registers for instructions in said program to be executed;

a process for performing mapping between said one or more logical registers and one or more physical registers, so that said one or more physical registers that are live at a procedure call in said program to be compiled are allocated from a bottom of a register stack; and a process for generating object code based on the mapping process.

2. A process for controlling a computer for conversion of a program to be executed, which permits said computer to perform:

a process for generating code while confirming that one or more registers are allocated for a predetermined instruction; and a process for, upon a calling of the procedure, so long as there is a vacancy in operation resources, copying said one or more registers residing in a register stack, to one or more free registers located at a bottom of said register stack.

3. A process for controlling a computer to execute an operation, which permits said computer to perform:

a process for, when a different procedure is called in a predetermined procedure, reallocating one or more registers that are allocated for execution of said predetermined procedure and that are live when a different procedure is called, and calling said different procedure; and a process for, upon returning from said different procedure, restoring a register image to a state immediately before the reallocation.

4. A non-signal storage medium on which a conversion program is stored that controls a computer for conversion of a program to be executed, said conversion program permitting said computer to perform the conversion program comprising:

a process for generating code while confirming that one or more registers are allocated for a predetermined instruction; and a process for, upon a calling of the procedure, so long as there is a vacancy in operation resources, copying said one or more registers residing in a register stack, to one or more free registers located at a bottom of said register stack.

* * * * *